United States Patent Office 3,379,249
Patented Apr. 23, 1968

3,379,249
PROCESS FOR OIL PRODUCTION BY
STEAM INJECTION
Ralph E. Gilchrist and Richard J. Sonnenfeld, Bartlesville, Okla., assignors to Phillips Petroleum Company, a corporation of Delaware
No Drawing. Filed July 29, 1966, Ser. No. 568,730
6 Claims. (Cl. 166—11)

This invention relates to an improved process for producing oil from a subterranean oil stratum by steam drive.

The recovery of oil by steam drive has become a common secondary or tertiary recovery process in the petroleum industry. Oil strata frequently contain clay, such as montmorillonite, which swells in contact with water condensed from steam (relatively salt-free), which materially reduces the permeability of the strata and increases the difficulty of oil recovery.

This invention is concerned with the elimination of swelling is an oil stratum containing a swellable clay when being produced by steam injection.

Accordingly, it is an object of the invention to provide an improved process for producing oil by steam injection and drive. Another object is to provide a steam injection and steam drive process which avoids swelling in an oil-bearing stratum containing a swellable clay. Other objects of the invention will become apparent to one skilled in the art upon consideration of the accompanying disclosure.

In accordance with the invention, an alkyl chloride or bromide such as ethylene dichloride is injected into an oil stratum thru an injection well therein and this injection is followed by injection of ammonia and the injected materials are driven thru the stratum and mixed so as to produce amines in situ, the steam and resulting fluids being driven thru the stratum toward a production well therein to produce oil, which is recovered from the production well by conventional means. The alkyl halide is injected as a liquid into the formation or downhole prior to steam injection, which vaporizes the alkyl halide and drives it into the stratum. A small slug of steam may be injected following the alkyl halide injection step before introducing ammonia to the injected steam. However, this injection of a slug of steam free of ammonia is not essential to the process.

Alkyl halides react with ammonia in an aqueous solution to produce diamines and polyamines, as well as glycols and ethanol amines, which serve as surface active agents in the process of the invention. Also, acid (HCl) is formed which assists in maintaining or increasing the permeability of the stratum thru which the drive is conducted.

Alkyl halides (chlorides and bromides) used in the process are halo alkanes which include mono and dihalides in which the halogens may be attached to the same or different carbon atoms, such as ethylidene chloride and ethylene dichloride. The alkyl radical preferably contains from 2 to 12 carbons. Ethylene dichloride or bromide is amenable to injection as a liquid or vaporized in steam. The halides may be diluted by dissolving them in alcohol, ether, or other suitable solvent.

The amount of alkyl halide injected is in the range of 0.05 to 5 percent hydrocarbon pore volume, larger quantities being feasible but uneconomical. The quantity of ammonia used is substantially stoichiometrically in excess of the amount of ethylene dichloride injected, such as at least twice the stoichiometric equivalent, although lower amounts function in the intended manner. Ammonia is most suitably injected into the stratum behind the ethylene dichloride in vapor form in the steam injected to drive the fluids and oil thru the stratum. Excess ammonia not only favors the formation of amines but also has a desirable effect per se on the displacement of oil.

A test was made in a glass tube packed with oil sand by injecting a slug of liquid ethylene dichloride into the sand followed by injection of a slug of ammonia in hot water (200° F.), simulating condensed steam. The effluent from the tube was collected and the oil and water separated. The oil was analyzed for amines and was found to contain a small amount thereof (0.1 weight percent). This test demonstrates that amines are formed upon contact of the two reactants in an oil sand formation at atmospheric temperatures and pressures. Since steam is injected in the process at temperatures of 500° F. and upwards and at pressures of 1,000 to 1,500 p.s.i. and higher, the production of amines and by-products is considerably higher under process conditions.

The process of the invention has several advantages or benefits. First, the ammonia in the steam lowers its surface tension and appreciably enhances the injection thereof into the formation. Second, the chemical reaction between ammonia and ethylene dichloride or other alkyl halide produces some acid (HCl) which effectively acidizes the formation thru which the drive is effected, particularly around the injection borehole where formation damage is apt to be most prevalent. Third, at high temperatures glycols are formed, as well as ethanol amines, which serve as surface active agents. Fourth, quaternary ammonium salts are formed in the reaction of alkyl halides with $NH_3$ which assist in preventing clay swelling. Thus, the process enhances oil recovery in a steam flood operation as applied to an oil stratum containing water-swellable clay.

A test was made with triethyl amine by contacting dried swellable clay pellets with an aqueous solution thereof and with distilled water. Arbitrarily assigning a swelling index of 100 to distilled water, the swelling index of 1.0 percent by volume solution of triethyl amine was 95 while the swelling index of a 3.0 volume percent solution of this amine was 89. Quaternary ammonium salts, which dissociate at steam temperatures and recombine as the temperature decreases, are also effective swelling reducers.

EXAMPLE

A steam injection operation in an oil stratum about 10 feet in thickness penetrated by a steam injection well and a surrounding ring of production wells comprises injecting sufficient ethylene dichloride to fill about 2.5 percent of the bore volume in an annulus surrounding the injection well to a depth of about 10 feet from the wellbore. Following the injection of ethylene dichloride, injection of steam at a temperature of about 600° F. and 1,500 p.s.i. containing about ½ weight percent of ammonia is commenced at a rate of about 8,000 pounds per hour and continued for about two days, after which the injection of ammonia into the steam is terminated and steam injection is continued. Operation in this manner forms amines in the stratum immediately surrounding the injection well so as to prevent clay swelling and provide the other benefits set forth herein. The steam drive thru the stratum toward the production wells is facilitated and produced fluids, including oil, are recovered thru the production wells.

It is feasible to repeat the injection of ethylene dichloride and ammonia, sequentially, to further aid in the production of oil. The ethylene dichloride can be injected into the steam as a vapor during the second treatment.

Certain modifications of the invention will become apparent to those skilled in the art and the illustrative details disclosed are not to be construed as imposing unnecessary limitations on the invention.

We claim:
1. A process for producing oil from an oil stratum containing water-swellable clay, which comprises the steps of:
  (a) injecting a substantial fluid slug of at least one alkyl halide of the group chlorides and bromides thru an injection well into said stratum toward a production well therein;
  (b) thereafter, injecting a substantial slug of ammonia thru said injection well behind the slug of step (a);
  (c) injecting steam into said stratum behind the slugs of steps (a) and (b) to cause mixing of said slugs and reaction of said alkyl halide and ammonia to form amines and drive an aqueous front thru said stratum toward said production well to produce oil therein; and
  (d) recovering produced fluids from said production well.

2. The process of claim 1 wherein the ammonia slug of step (b) is injected in steam and the alkyl halide comprises ethylene dichloride.

3. The process of claim 1 wherein the alkyl halide of step (a) is injected into the injection well as a liquid in step (a) followed by steam injection to vaporize and deposit the halide in the surrounding stratum.

4. The process of claim 3 wherein a relatively small steam slug free of alkyl halide and ammonia is injected intermediate steps (a) and (b).

5. The process of claim 1 wherein the amount of alkyl halide in step (a) is in the range of 0.05 to 5 percent pore volume and the amount of ammonia is in substantial excess of the amount of ethylene dichloride.

6. The process of claim 5 wherein the alkyl chloride has from 2 to 12 carbon atoms per molecule.

References Cited
UNITED STATES PATENTS

| | | | |
|---|---|---|---|
| 2,813,583 | 11/1957 | Marx et al. | 166—11 |
| 3,047,062 | 7/1962 | Meadors | 166—9 |
| 3,111,984 | 11/1963 | Reisberg | 166—9 |
| 3,111,985 | 11/1963 | Reisberg | 166—9 |
| 3,185,214 | 5/1965 | Bernard et al. | 166—9 |
| 3,204,694 | 9/1965 | Johnson et al. | 166—11 |
| 3,292,702 | 12/1966 | Boberg | 166—40 |
| 3,297,090 | 1/1967 | Dilgren | 166—38 |
| 3,302,713 | 2/1967 | Ahearn et al. | 166—9 |

STEPHEN J. NOVOSAD, *Primary Examiner.*